(12) United States Patent
Fujishima et al.

(10) Patent No.: US 8,290,001 B2
(45) Date of Patent: Oct. 16, 2012

(54) BROADBAND WIRELESS COMMUNICATION RESOURCE ASSIGNING METHOD, BASE STATION APPARATUS AND TERMINAL APPARATUS

(75) Inventors: Kenzaburo Fujishima, Kokubunji (JP);
Masanori Taira, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 779 days.

(21) Appl. No.: 12/279,750

(22) PCT Filed: Dec. 14, 2006

(86) PCT No.: PCT/JP2006/324969
§ 371 (c)(1),
(2), (4) Date: Aug. 18, 2008

(87) PCT Pub. No.: WO2007/111010
PCT Pub. Date: Oct. 4, 2007

(65) Prior Publication Data
US 2010/0220607 A1    Sep. 2, 2010

(30) Foreign Application Priority Data
Mar. 29, 2006 (JP) .................................. 2006-091137

(51) Int. Cl.
*H04B 3/10* (2006.01)
(52) U.S. Cl. ........................................ 370/491; 370/500
(58) Field of Classification Search .................. None
See application file for complete search history.

(56) References Cited

U.S. PATENT DOCUMENTS

| 7,239,879 B2 | 7/2007 | Avidor et al. | |
| 2004/0166869 A1* | 8/2004 | Laroia et al. | 455/450 |
| 2004/0190484 A1* | 9/2004 | Shin et al. | 370/347 |
| 2004/0203476 A1 | 10/2004 | Liu | |
| 2005/0181799 A1* | 8/2005 | Laroia et al. | 455/450 |
| 2005/0208961 A1* | 9/2005 | Willenegger | 455/522 |

(Continued)

FOREIGN PATENT DOCUMENTS

JP    2001-333097    11/2001

(Continued)

OTHER PUBLICATIONS

Hara et al., "MC-CDM System for Packet Communications Using Frequency Scheduling", IEICE Technical Report, RCS2002-129, Jul. 2002, p. 61-66.

(Continued)

*Primary Examiner* — Hassan Phillips
*Assistant Examiner* — Eunsook Choi
(74) *Attorney, Agent, or Firm* — Antonelli, Terry, Stout & Kraus, LLP.

(57) ABSTRACT

Arrangements for assigning a frequency resource for a wireless communication system. Included are: dividing a frequency available into a plurality of segments and assigning another terminal apparatus to communicate with each segment, wherein, with regard to a first specified number of segments, assigning via the base station apparatus, based on a number of communication times anticipated per each terminal apparatus and a probability of exceeding a communication capacity decided by a threshold value per each terminal apparatus, a second specified number of segments that is smaller than the first to each terminal apparatus, and notifying the terminal apparatuses of the assignment result, referring to the assignment result via the terminal apparatus, and carrying out scheduling via the base station apparatus to decide which terminal apparatus to communicate with per each segment based on the radio channel quality fed back from the each terminal apparatus.

13 Claims, 20 Drawing Sheets

U.S. PATENT DOCUMENTS

| | | | |
|---|---|---|---|
| 2006/0002421 A1 | | 1/2006 | Kuwahara et al. |
| 2006/0007884 A1 | | 1/2006 | Tanaka et al. |
| 2007/0019717 A1 | * | 1/2007 | Laroia et al. .................. 375/222 |
| 2007/0155323 A1 | | 7/2007 | Matsumoto et al. |
| 2007/0298728 A1 | | 12/2007 | Imamura et al. |
| 2008/0063097 A1 | * | 3/2008 | Horiuchi et al. ............... 375/260 |
| 2010/0278034 A9 | * | 11/2010 | Laroia et al. .................. 370/209 |

FOREIGN PATENT DOCUMENTS

| | | |
|---|---|---|
| JP | 2002-252619 | 9/2002 |
| JP | 2004-135305 | 4/2004 |
| JP | 2005-184799 | 7/2005 |
| JP | 2005-244958 | 9/2005 |
| WO | WO 2004-084505 A1 | 9/2004 |
| WO | WO 2006-028204 A1 | 3/2006 |

OTHER PUBLICATIONS

3GPP2 C.S0024-A "cdma2000 High Rate Packet Data Air Interface Specification" (p. 11-80, Mar. 31, 2004).

3GPP TR 25.814 V1.1.1, "3rd Generation Partnership Project; Technical Specification Group Radio Access Network; Physical Layer Aspects for Evolved UTRA (Release7)" (pp. 18 and 24, Feb. 2006).

Jim Tomcik, "QFDD and QTDD: Technology Overview", Contributions on IEEE 802.20 Mobile Broadband Wireless Access, IEEE C802.20-05/68r1, Jan. 2006. (pp. 79 to 84).

Ericsson, NTT DoCoMo, E-UTRA Downlink Control Signaling Overhead Assessment, R1-060573, 3GPP, Feb. 17, 2006.

Samsung Downlink chunk bandwidth for frequency selective scheduling, R1-051041, 3GPP, Oct. 14, 2005.

* cited by examiner

FIG. 1
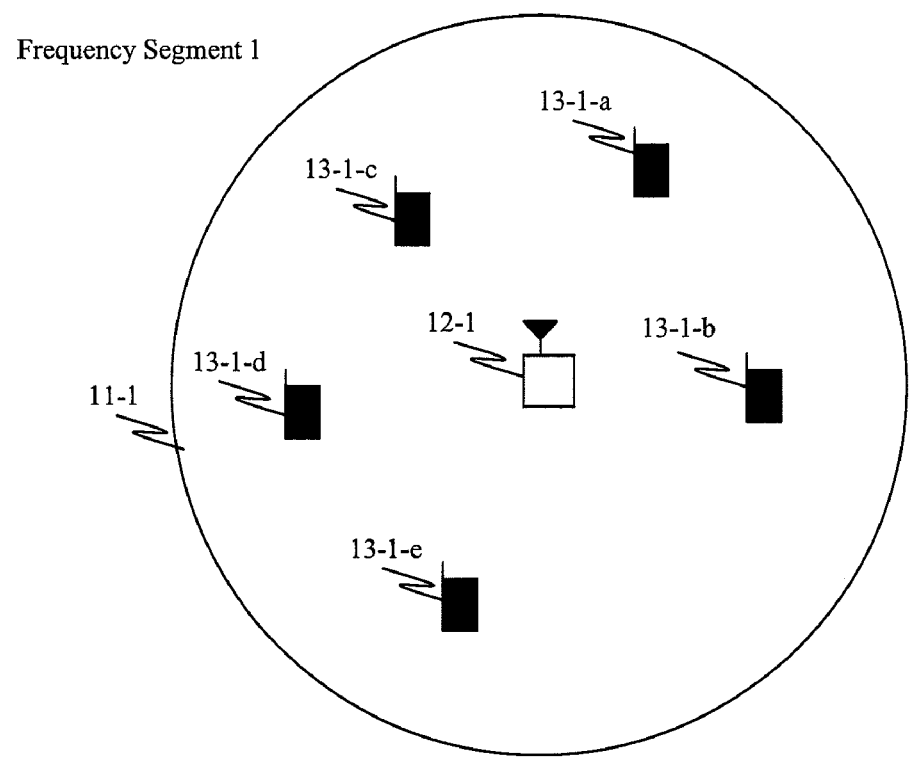
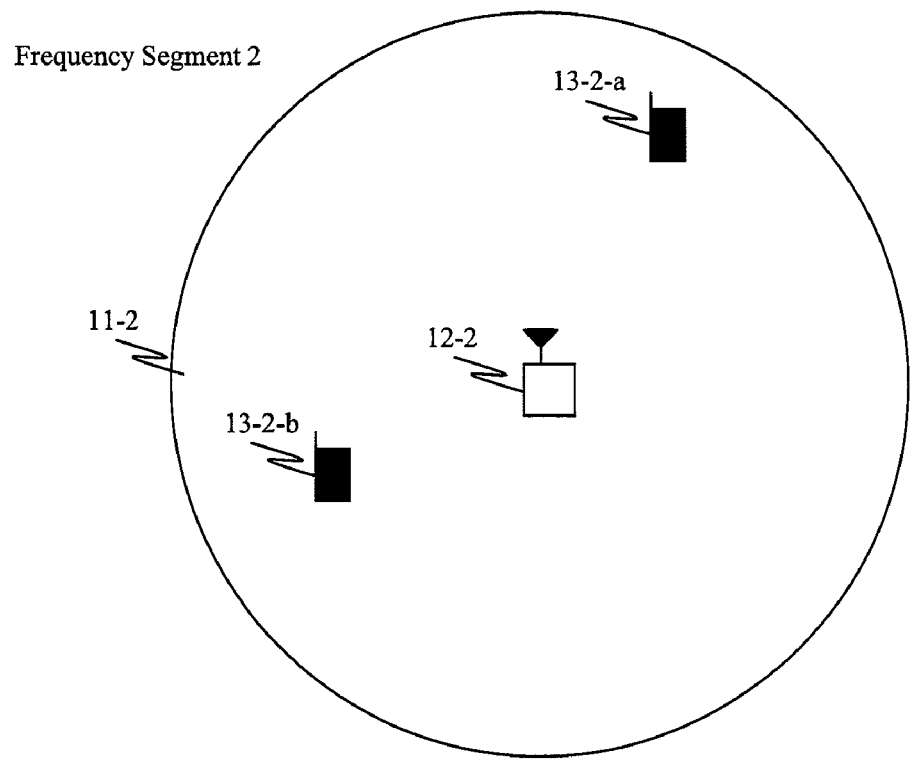

FIG. 2
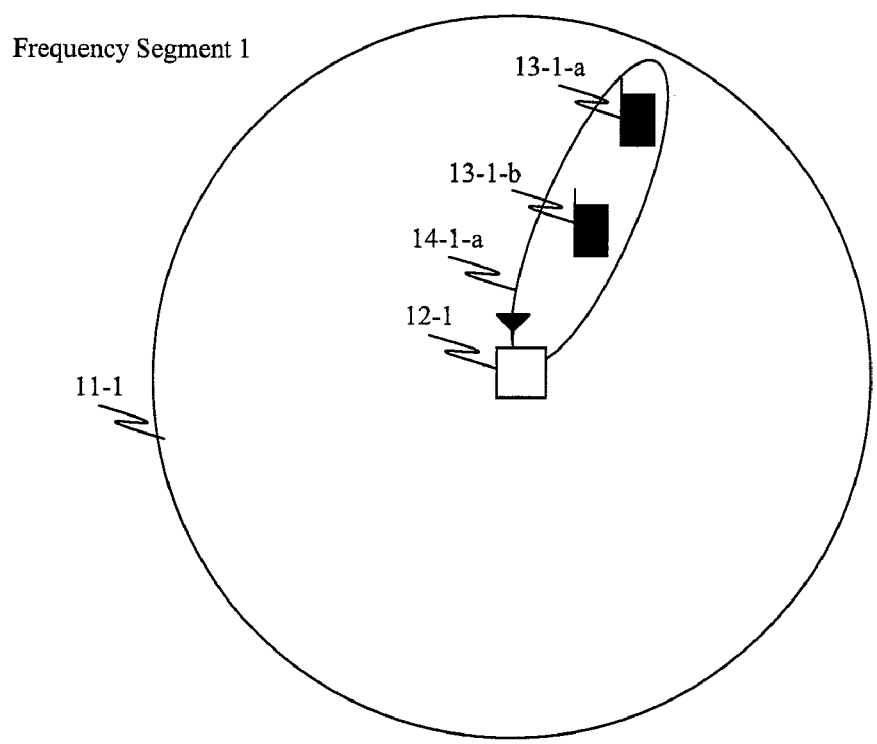
Frequency Segment 1
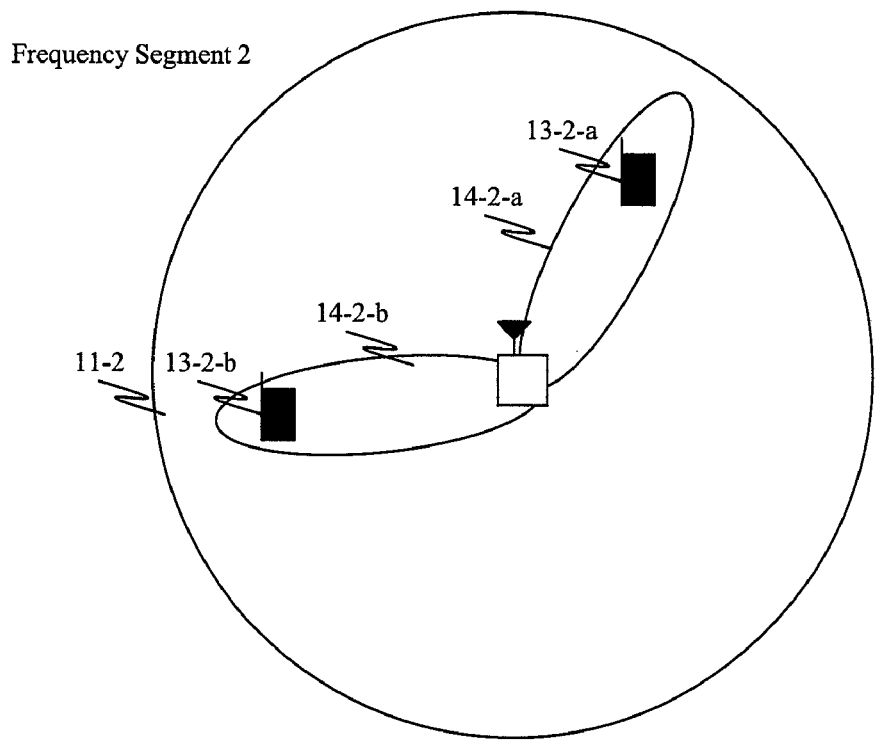
Frequency Segment 2

FIG. 3
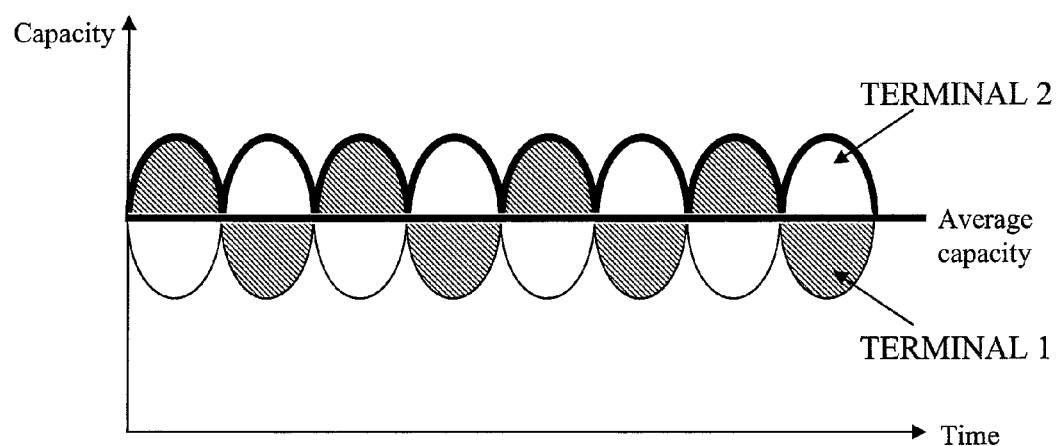
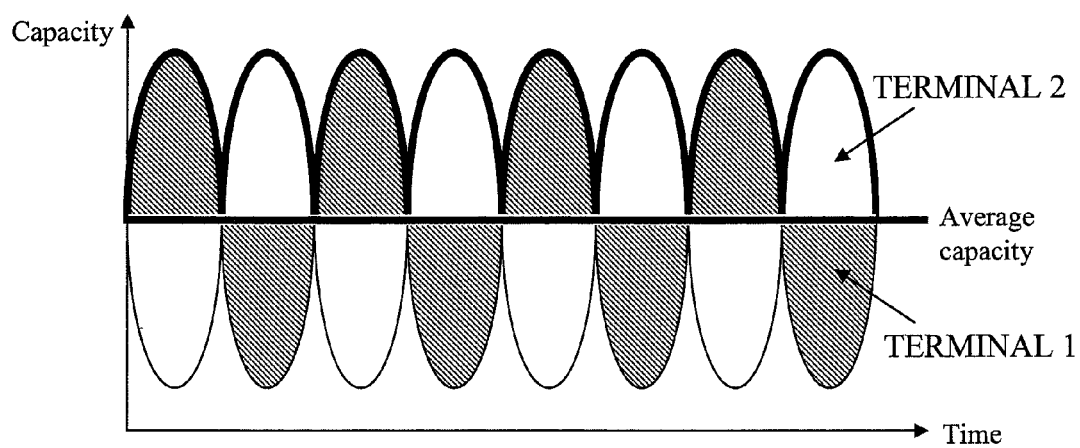

FIG. 8

| Field | Length |
| --- | --- |
| Message ID | 8 bits |
| User ID | 8 bits |
| AveCapacitySegment #0 | 8 bits |
| StdCapacitySegment #0 | 8 bits |
| AveCapacitySegment #1 | 8 bits |
| StdCapacitySegment #1 | 8 bits |
| ⋮ | ⋮ |
| AveCapacitySegment #N-1 | 8 bits |
| StdCapacitySegment #N-1 | 8 bits |

FIG. 9

| Field | Length |
| --- | --- |
| Message ID | 8 bits |
| User ID | 8 bits |
| CapacityIndicator #0 | 4 bits |
| ⋮ | ⋮ |
| CapacityIndicator #M-1 | 4 bits |

FIG. 10
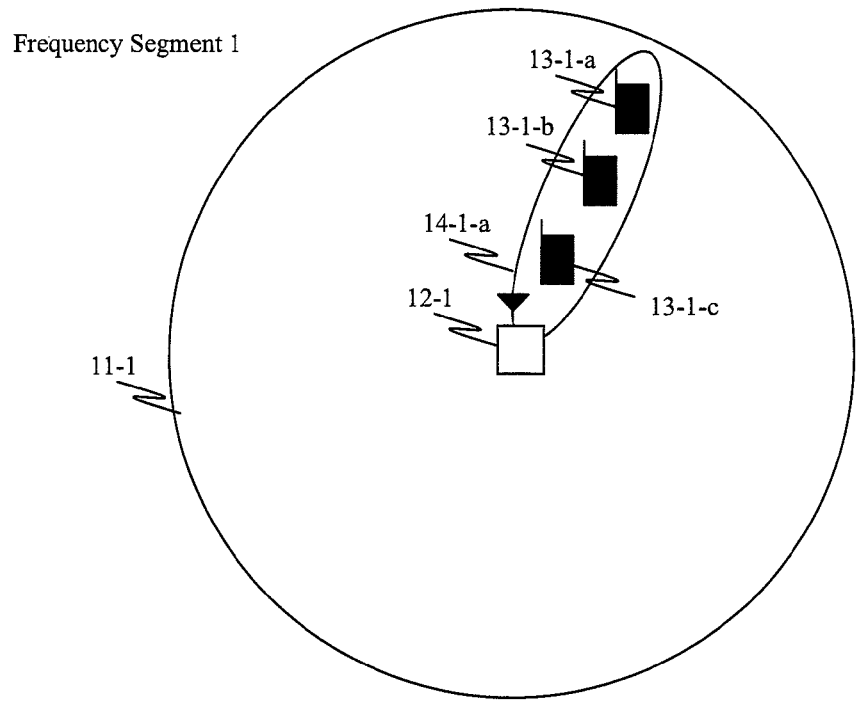
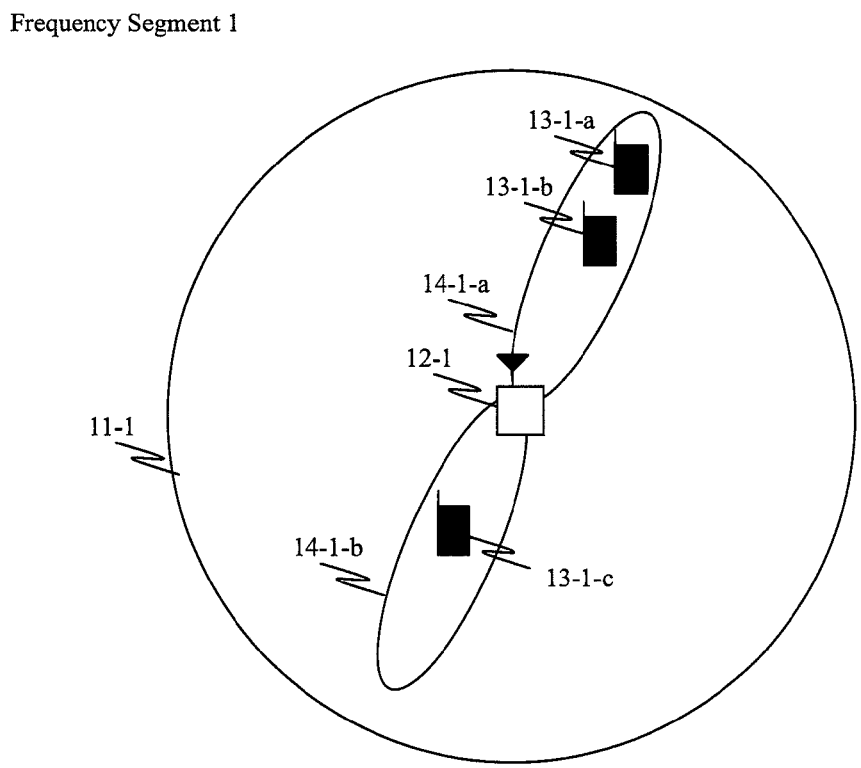

FIG. 11

| TERMINAL ID | FREQUENCY SEGMENT ID | HIGH COMMUNICATION CAPACITY OCCURRENCE RATIO | COMMUNICATION CAPACITY AVERAGE VALUE | COMMUNICATION CAPACITY STANDARD DEVIATION VALUE |
|---|---|---|---|---|
| 0 | 0 | 50% | 2.0 | 1.0 |
| | 1 | 55% | 2.0 | 1.5 |
| | ... | ... | ... | ... |
| | N-1 | 40% | 1.0 | 2.0 |

FIG. 12

| TERMINAL ID | FREQUENCY SEGMENT ID | ASSIGNMENT EVALUATION VALUE | EXPECTED VALUE OF THE NUMBER OF COMMUNICATION TIMES | HIGH COMMUNICATION CAPACITY OCCURRENCE RATIO |
|---|---|---|---|---|
| 0 | 0 | 0.1 | 0.20 | 50% |
|  | 1 | 0.275 | 0.50 | 55% |
|  | ... | ... | ... | ... |
|  | N-1 | 0.4 | 1.0 | 40% |

FIG. 13

| Field | Length |
|---|---|
| Message ID | 8 bits |
| User ID | 8 bits |
| AssignSegment #0 | 1 bits |
| ⋮ | ⋮ |
| AssignSegment #N-1 | 1 bits |

FIG. 18

| INDICATOR | ESTIMATED TRANSMISSION RATE | NUMBER OF BITS | ENCODING RATIO | MODULATION METHOD |
|---|---|---|---|---|
| 0 | 300Kbps | 1024 | 1/5 | QPSK |
| 1 | 1.2Mbps | 2048 | 1/3 | QPSK |
| 2 | 1.8Mbps | 3072 | 1/3 | 8PSK |
| 3 | 2.4Mbps | 4096 | 1/3 | 16QAM |

FIG. 19

| FREQUENCY SEGMENT ID | 0 | 1 | 2 |
|---|---|---|---|
| NUMBER OF ASSIGNED TERMINALS | 2 | 2 | 3 |
| TERMINAL APPARATUS ID | 0 | 2 | 4 |
| DIRECTION | 0 DEG | 10 DEG | 80 DEG |
| TERMINAL APPARATUS ID | 1 | 3 | 5 |
| DIRECTION | 180 DEG | 50 DEG | 200 DEG |
| TERMINAL APPARATUS ID | | | 6 |
| DIRECTION | | | 320 DEG |

FIG. 20

| FREQUENCY SEGMENT ID | 0 | 1 | 2 |
|---|---|---|---|
| NUMBER OF ASSIGNED TERMINALS | 2 | 3 | 4 |
| TERMINAL APPARATUS ID | 0 | 2 | 4 |
| DIRECTION | 0 DEG | 10 DEG | 80 DEG |
| TERMINAL APPARATUS ID | 1 | 3 | 5 |
| DIRECTION | 180 DEG | 50 DEG | 200 DEG |
| TERMINAL APPARATUS ID |  | 0 | 6 |
| DIRECTION |  | 0 DEG | 320 DEG |
| TERMINAL APPARATUS ID |  |  | 0 |
| DIRECTION |  |  | 0 DEG |

FIG. 21A

| TERMINAL APPARATUS ID | FREQUENCY SEGMENT ID | EXPECTED VALUE OF THE NUMBER OF COMMUNICATION TIMES |
|---|---|---|
| 0 | 0 | 1/2 |
| | 1 | 1/3 |
| | 2 | 1/4 |

FIG. 21B

| TERMINAL APPARATUS ID | FREQUENCY SEGMENT ID | EXPECTED VALUE OF THE NUMBER OF COMMUNICATION TIMES |
|---|---|---|
| 0 | 0 | 1 |
| | 1 | 1/2 |
| | 2 | 1 |

BROADBAND WIRELESS COMMUNICATION RESOURCE ASSIGNING METHOD, BASE STATION APPARATUS AND TERMINAL APPARATUS

TECHNICAL FIELD

The present invention relates to a transmitting and receiving apparatus used in a broadband wireless communication system and a transmitting and receiving method.

BACKGROUND ART

In recent years, in broadband wireless communication systems, OFDMA that assigns different terminal apparatuses to respective parts of the system band has been attracting attention. OFDMA is a multi dimensional access technology based on OFDM in which subcarriers perpendicular to each other are arranged on a frequency axis, and a segment in which a plurality of subcarriers are bundled up is set as a resource unit, and a base station apparatus assigns different segments to respective terminal apparatuses.

To increase the frequency usage efficiency of the wireless communication system using OFDMA, it is effective to compare the communication quality of every segment in each terminal apparatus so as to assign each segment to the terminal apparatus having a preferable quality. In the wireless communication system, communication quality changes with time. Accordingly, in the case of downlink communications, each terminal apparatus measures the communication quality at a specified spacing, and feeds it back to the base station apparatus. The technology to dynamically assign the frequency segment whose communication quality is preferable to each terminal apparatus is called a frequency scheduling technology, and it has been studied flourishingly (for example, refer to Patent Document 1 or Non-Patent Document 1).

As the representative algorithms of the scheduling, there are known three kinds that are: (1) Maximum CIR Algorithm; (2) Round Robin Algorithm; and (3) Proportional Fairness Algorithm. In the algorithm (1), transmission opportunities are assigned with priority to a terminal apparatus whose communication quality is preferable. As the communication opportunities with the terminal apparatuses near the base station apparatus increase, communication opportunities with the terminal apparatuses at distant places decrease; therefore, it is a scheduling algorithm in which the service differences become large among the terminal apparatuses. In the algorithm (2), the communication opportunities are assigned to all terminal apparatuses equally. In comparison with (1), as the communication opportunities with the terminal apparatuses at the distant place are increased, the throughput of the base station apparatus is declined. In the algorithm (3), a value of (real-time communication quality)/(average communication quality) is used as the evaluation value, and the transmission opportunities are assigned with priority to the terminal apparatus whose evaluation value is large, and accordingly, it is an algorithm in which the communication opportunities are equal, and the frequency usage efficiency is superior to (2). However, it is a problem that the base station apparatus must precisely know the real-time downlink communication quality in every wireless terminal apparatus.

Patent Document 1: Japanese Patent Application Laid-Open Publication No. 2002-252619
Patent Document 2: Japanese Patent Application Laid-Open Publication No. 2005-244958

Non-Patent Document 1: "MC-CDM System for Packet Communications Using Frequency Scheduling", IEICE Technical Report, RCS2002-129, Jul., 2002, p. 61-66
Non-Patent Document 2: 3GPP2 C.S0024-A "cdma2000 High Rate Packet Data Air Interface Specification" (page 11-80, Mar. 31, 2004)
Non-Patent Document 3: 3GPP TR 25.814 V1.1.1, "3rd Generation Partnership Project; Technical Specification Group Radio Access Network; Physical Layer Aspects for Evolved UTRA (Release7)" (pages 18 and 24, 2006/2)
Non-Patent Document 4: Jim Tomcik, "QFDD and QTDD: Technology Overview", Contributions on IEEE 802.20 Mobile Broadband Wireless Access, IEEE C802.20-05/68r1, Jan. 2006. (pages 79 to 84)

DISCLOSURE OF THE INVENTION

The Proportional Fairness in which both the throughput of the base station apparatus and the communication opportunity equality (fairness) among the terminal apparatuses are attained has been already put to practical use in the cdma2000EV-DO (Evolution Data Only) system. In the system, the terminal apparatus uses 2,400 [bit/s] for an uplink band to feed back communication quality information DRC value (Data Rate Control, from Non-Patent Document 2) of 4 [bits] per one slot 1.67 [ms]. 2,400 [bit/s] is a number per one terminal apparatus when upon sharing one frequency segment by a plurality of terminal apparatuses. For example, in the case where 50 terminal apparatuses are connected with a base station apparatus, an uplink band of 2,400×50, i.e., 120,000 [bit/s] is necessary at the base station apparatus.

The uplink band that is necessary for the feedback of the communication quality information is in inverse proportion with the cycle in which the terminal apparatus feeds back DRC, and is in proportion with the number of the frequency segments to be fed back. Therefore, when the above feedback is carried out at the 0.5 [ms] subframe spacing that is defined in the LTE (Long Term Evolution, cf. Non-Patent Document 3) of 3GPP, 400,000 [bit/s] is needed as a result of 120,000 [bit/s]×1.67/0.5. Similarly, when a PRB (Physical Resource Block) of 375 [KHz] in which 25 subcarriers of 15 [kHz] spacing that is defined to LTE are bundled up is considered as a frequency segment and also all feedbacks are carried out assuming the system band thereof as 100 [MHz], the base station's uplink throughput of about 107 [Mbit/s] is necessary as a result of 400,000×100,000,000/375,000.

As mentioned above, a first problem to be solved by the present invention is to reduce the enormous uplink throughput of the base station that the feedback information needs so as to improve the uplink throughput of useful user data.

With regard to the first problem, one solution is shown in Patent Document 2. The method shown in Patent Document 2 is a method in which the terminal apparatus measures the communication quality of all frequency segments, and feeds back only the information of the segments whose communication quality is preferable to the base station apparatus. Although it is true to be possible to reduce the feedback information by this method, a problem is surely left at the point where the frequency segments that the terminal apparatus chooses does not always guarantee a high downlink throughput to the terminal apparatus. Since the throughput is decided by (the number of communication bits per one communication)×(the number of communication times), to achieve a high throughput, it is necessary to guarantee not only the communication quality but also the number of communication times.

As mentioned above, a second problem to be solved by the present invention is to carry out a frequency segment assignment to guarantee many numbers of communication times and preferable communication quality to every terminal apparatus so as to increase the downlink throughput. To solve this second problem together, a solution of the first problem different from that in the Patent Document 2 will be disclosed.

Meanwhile, it is assumed that the statistics values of communication capacity are different every frequency segment in the present invention, and the reason thereof will be explained.

In the present invention, it is assumed that spatial multiplex communications by beam-forming are carried out every frequency segment in a broadband communication system. As mentioned in the first problem, in the broadband communication system, when the usage of all the segment is permitted to all the terminal apparatuses, the feedback information amount becomes enormous; therefore, for example, like the present invention, limiting segments available to each terminal apparatus is considered. As a result, since the combinations of the terminal apparatuses belonging to each segment are different, those spatial multiplex interferences affecting to the circumference are not guaranteed to become uniform among the segments. This is the ground to think that the statistics values of communication capacity are different in each segment.

The phenomenon mentioned above may be considered as a state where FFR (Fractional Frequency Reuse, Non-Patent Document 4) is carried out in a wide sense because the frequency segments to be used are different in each direction viewed from the base station. Conversely speaking, when the FFR is carried out by some kind of method, the statistics values of the communication capacity do not become same in all the frequency segments.

To solve the problems, the base station apparatus assigns segments whose number of communication times is large and whose communication quality is high to each terminal apparatus so as to reduce the number of the frequency segments that feed back DRC per a terminal apparatus.

In order to guarantee the number of communication times per a terminal apparatus, it is required that there are a small number of competitors at the moment of the assignment of frequency segments.

When the base station apparatus transmits downlink packets by an Omni beam pattern per frequency segment, there are competitors of the number of the terminal apparatuses to which the frequency segment is assigned. In FIG. 1, an example in which the numbers of competitors are different in respective frequency segment is shown. In the upper section of the figure shows a frequency segment 1 and the lower section shows a frequency segment 2. The base station apparatus 12-1 and 12-2 output Omni beam patterns 11-1 and 11-2 in different frequency segments, respectively. In the frequency segment 1, one terminal apparatus among five terminal apparatuses 13-1-a, b, c, d, e may communicate in each slot, meanwhile in the frequency segment 2, either of two terminal apparatuses 13-2-a, b may communicate. Since the number of the terminal apparatuses that can communicate per one slot is one unit in each segment, there are 5 competitors in the segment 1, and there are 2 competitors in the segment 2. In addition, while two base station apparatuses 12-1 and 12-2 are shown in FIG. 1 to clearly show the characteristics of each frequency segment, in fact, these are the same apparatus.

Further, in the case where the spatial multiplex communications are carried out by directional beams in each frequency segment, there is the case where terminal apparatuses whose directions are as away from the base station as the spatial multiplex is possible do not become competitors to each other in the schedule control. An example thereof is shown in FIG. 2. In the example of the frequency segment 1 shown in the upper section, the directions of the two terminal apparatuses 13-1-a, b viewed from the base station apparatus 12-1 are same; therefore, the space division multiplex communications of both the terminal apparatuses by the directional beam 14-1-a is difficult. Therefore, the respective terminal apparatuses become competitors to each other. In contrast, in the frequency segment 2, since the directions of the two terminal apparatus 13-2-a, b are different with each other, the spatial segmentation multiplex communication by the directional beams 14-2-a, b is possible. Therefore, the respective terminals do not become competitors to each other.

In consideration of the foregoing, an expected value of the number of communication times per a frequency segment of each terminal apparatus is calculated by a reciprocal number of the number of the competitors. When the base station apparatus assigns the frequency segments to the terminal apparatus, the throughput improvement of the terminal apparatus is expected by assigning to the frequency segment whose expected value is large. To calculate the number of the competitors, the spatial property of each terminal apparatus (the direction of each terminal apparatus) viewed from the base station apparatus, and assignment information about on which terminal apparatus is assigned to which frequency segment are necessary.

Therefore, as means to guarantee the number of communication times per each terminal apparatus, means to measure the spatial property of each terminal apparatus and means to assign the terminal apparatus to each frequency segment are provided to the base station apparatus.

To increase the communication quality in each terminal apparatus, it is desirable to assign the frequency segment whose communication quality is preferable to each terminal apparatus. However, it is thought that, when the terminal apparatus disorderly feeds back DRC about the frequency segment of each best N (N being an integer) as shown in the Patent Document 2, a difference occurs among the number of the terminal apparatuses feeding back the DRC by the frequency segments as shown in FIG. 1, and it is assumed that the number of communication times cannot be obtained in some terminal apparatuses.

Accordingly, the base station apparatus assigns the terminal apparatus to the frequency segment orderly so that the expected value of the number of communication times of each frequency segment increases in each terminal apparatus. With that, to increase the downlink throughput of each terminal, it is desirable to measure the average and dispersion of the communication capacity of each frequency segment at each terminal and to assign each terminal apparatus to the frequency segment whose statistics values (average and dispersion) of the communication capacity is high. While it is clear that the terminal apparatus throughput increases by assigning the frequency segment whose average of the communication capacity is high, a reason why the terminal throughput is improved when the dispersion is high will be described with reference to FIG. 3.

The upper section of FIG. 3 shows a graph in which the horizontal axis shows time and the vertical axis shows downlink communication capacity, and shows changes with time of the communication capacity about two terminal apparatuses in a certain frequency segment. Averages and dispersions of communication capacities of both the terminal apparatuses are same, and the case where communication capacities thereof alternately exceed the average value is shown. Since the base station apparatus chooses a better one (shown by bold line) of both the terminal apparatuses one after another, it is possible to increase the total throughput for the two terminal apparatuses by user diversity. The lower section of FIG. 3 is same as the upper section except that the dispersion of the communication capacity is large. As is apparent from the figure, the larger the dispersion is, the higher the effect of user diversity becomes, and it is possible to further increase the total throughput for the two terminal apparatuses. In addition, even if the average communication capacities of the two terminal apparatuses are different, because the terminal apparatus whose instantaneous plus (positive) deviation of the average communication capacity of each terminal apparatus is large is chosen one after another in the Proportional Fairness, the effect of user diversity does not change. However, in the case where one of two frequency segments whose dispersions of the communication capacities are same but whose averages are different is assigned to a certain terminal apparatus, it is desirable to assign the frequency segment whose average is higher.

A concrete method of the above assignment will be described with reference to FIG. 4.

FIG. 4 shows a graph in which the horizontal axis shows downlink communication capacity, and the vertical axis shows probability density, and shows a distribution of the communication capacity per each frequency segment about a certain terminal apparatus. An average of an average per each segment is defined as Ensemble Average. The communication capacity to become the control target is defined as Threshold, and the occurrence probability of the communication capacity exceeding the Threshold is calculated per each frequency segment. The Threshold is defined per each terminal apparatus. One of the occurrence probability calculation methods is shown. Upon assuming that the dispersion of the communication capacity of each frequency segment is a normal distribution, from the average value and the standard deviation value of the communication capacity, it is calculated per each segment that how many times a value obtained by subtracting the average value from the above Threshold should be multiplied to be equivalent to the normal deviation value. This calculated value corresponds to the occurrence probability one-on-one.

To realize this calculation, means to measure the statistics values of the communication capacities about all the frequency segments in each terminal apparatus, means to feed back the measurement result to the base station apparatus by a cycle that is sufficiently longer than the DRC feedback, means to carry out the calculation of the occurrence probability of the communication capacity exceeding the Threshold based on the communication capacity statistics values per each frequency segment of all the terminal apparatuses in the base station apparatus, and means to assign the terminal apparatus per each frequency segment are necessary.

To fuse the means to guarantee the number of communication times and the means to guarantee the communication quality, it is a feature of the means to assign the terminal apparatus to each frequency segment which the base station apparatus has that the means assigns the frequency segment that has few competitors sharing the same segment and whose average and dispersion of the communication capacity are high to each terminal apparatus.

According to the assignment shown above, the base station apparatus limits the segment that feeds back the communication quality information (corresponds to DRC) to the terminal apparatus to M segments (M<N: N being the number of all the segments) and reduces the uplink band necessary for the feedback of the communication quality information. The terminal apparatus feeds back the communication quality information about the assigned M segments to the base station apparatus per each slot, and the base station apparatus carries out scheduling per each slot based on the communication quality information of each terminal apparatus, and assigns a segment for transmitting the downlink data packets to each terminal apparatus in a range of 0 to M segments per each slot.

In a wireless communication system carrying out broadband packet communications, by assigning an available frequency segment per each terminal apparatus, it is possible to reduce the feedback information necessary for downlink adaptation and to increase throughput of useful user data in the uplink communications. Further, by carrying out the assignment of the above-mentioned segment so as to guarantee many numbers of communication times and high communication quality to each terminal apparatus, it is also possible to increase the downlink throughput.

BRIEF DESCRIPTIONS OF THE DRAWINGS

FIG. 1 is an explanatory diagram (1) about an expected value of the number of communication times per each frequency segment;

FIG. 2 is an explanatory diagram (2) about an expected value of the number of communication times per each frequency segment;

FIG. 3 is a diagram showing increase of a user diversity effect by increase of the communication capacity dispersion;

FIG. 8 is a diagram showing an example of a message format to feed back statistics values of a communication capacity;

FIG. 9 is a diagram showing an example of a message format to feed back instantaneous values of a communication capacity;

FIG. 10 is an explanatory diagram about changes of expected values of the number of communication times upon a terminal apparatus addition assignment;

FIG. 11 is a diagram showing an example of a counting result of occurrence probability of high communication capacity;

FIG. 12 is a diagram showing an example of evaluation values to assign a frequency segment to a terminal apparatus;

FIG. 13 is a diagram showing an example of a message format to notify an assignment result of the frequency segment;

FIG. 18 is a diagram showing an example of relations of the number of bits, an encoding rate, and a modulation method to the indicator;

FIG. 19 is a diagram showing an example (1) of control of frequency segment assignment information in the base station apparatus;

FIG. 20 is a diagram showing an example (2) of control of frequency segment assignment information in the base station apparatus; and FIG. 21A-21B are a diagrams showing examples of a counting result of an expected value of the number of communication times.

BEST MODE FOR CARRYING OUT THE INVENTION

Figure 4:
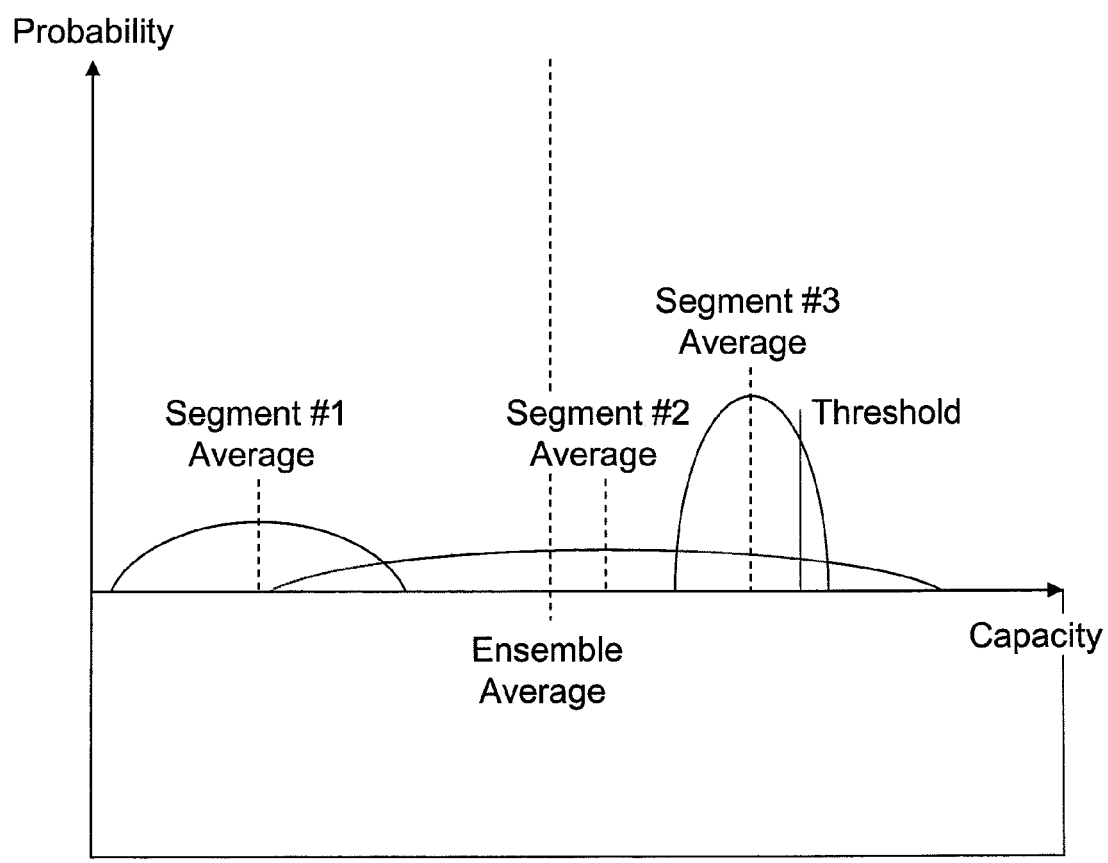
FIG. 4 is a diagram showing communication quality distributions of respective frequency segments.
Figure 5:
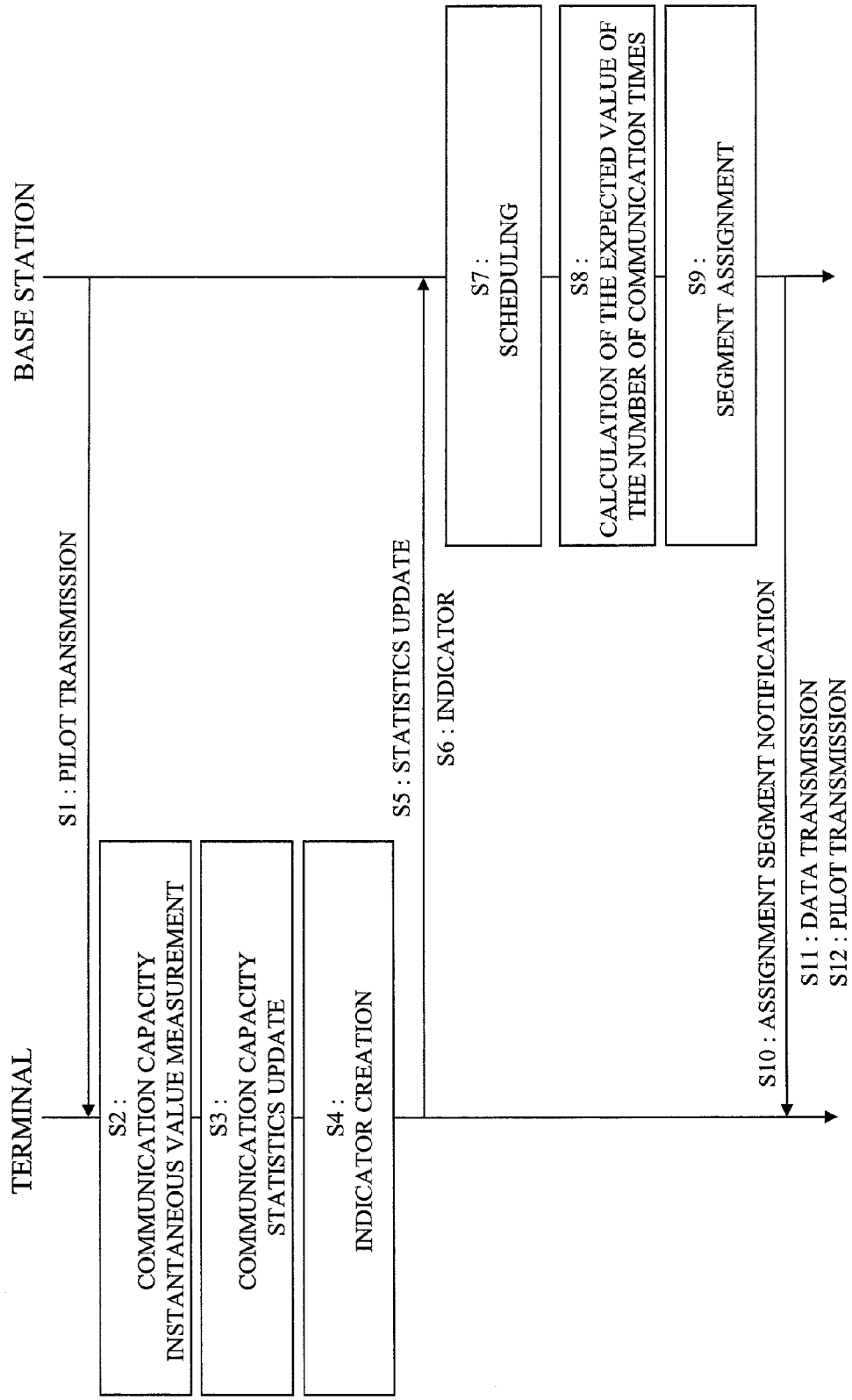
FIG. 5 is a diagram showing a best embodiment of a control method according to the present invention.

In FIG. 5, a control method to carry out the present invention is shown.

A base station apparatus transmits a pilot signal per each slot (S1). While the terminal apparatus first carries out a cell search by use of the pilot and establishes a connection with the base station apparatus, herein, descriptions will be made on the supposition that the connection is already established.

The terminal apparatus, on receiving the pilot signal, measures an instantaneous value of a communication quality (SINR: Signal to Interference plus Noise Ratio) per each frequency segment and converts the same into a communication capacity by the expression of the Shannon's channel capacity (S2), and continues adding the instantaneous value of the communication capacity and the square value thereof per each segment over a plurality of slots and averages them at a specified cycle (period) and calculates statistics values (average and dispersion of the communication capacity) per each segment (S3), and clears the buffer for the above addition. Further, the instantaneous value of the communication capacity is converted into an indicator at the next step (S4). The conversion into indicator is realized by a table look-up of the communication capacity. The value of the communication capacity may be just fed back as it is, but it is desirable to convert the same into the indicator so as to reduce the feedback information amount to feed back. In addition, it is only M segments (M<N) assigned by the base station apparatus, among all the N segments, that are converted into the indicator of the communication capacity.

After the completion of the above process, the terminal apparatus sends control information to the base station apparatus. The control information shall include the following two kinds. That are: (1) statistics values of the communication capacity of each of all the frequency segments (S5), and (2) the indicator showing the instantaneous communication capacity of the frequency segment assigned to the terminal (S6), that is all. With regard to (1), the terminal apparatus feeds back the statistics values about all the N segments (average value and standard deviation value) at a long cycle. With regard to (2), the terminal apparatus feeds back the indicator of the communication capacity instantaneous value of the M segments (M<N) assigned by the base station apparatus, among all the N segments, at a short cycle per each slot.

FIG. 8 shows an example of a format of the control signal feeds back the average value and the standard deviation of the communication capacity (S5 of FIG. 5). The first Message ID is an 8-bit value promised with the base station apparatus, and it is for the purpose of showing that the following information is the average value and the standard deviation of the communication capacity per each frequency segment. The second stage shows a terminal apparatus ID of the source of transmission. AveCapacitySegment #n and StdCapacitySegment #n (n being 0 to N−1, N being the number of all segments) after the third stage show an average value and a standard deviation of the communication capacity of a frequency segment n.

FIG. 9 shows an example of a format of the control signal to feed back the indicator showing the instantaneous communication capacity of the frequency segment assigned to the terminal (S6 of FIG. 5). The first Message ID is an 8-bit value promised with the base station apparatus, and it is for the purpose of showing that the following information is the indicator which shows the instantaneous communication capacity. The second stage shows the terminal apparatus ID of the source of transmission. CapacityIndicator #m (m: 0 to M−1, M being the number of the frequency segments assigned to the terminal apparatus) after the third stage is the indicator showing the instantaneous communication capacity of each frequency segment. The base station apparatus carries out scheduling per each slot based on the indicator (S7 of FIG. 5), and assigns segments to transmit the downlink data packets to each terminal apparatus, 0 to M segments per each slot, among the segments that feed back the indicator. The base station apparatus that assigns the M pieces of the segments to the terminal apparatus in S9 of FIG. 5 grasps how M pieces of the indicators are mapped to N pieces of the segments. If the sequence of the frequency segments (ascending sequence of the frequency segments) that the base station apparatus notifies when the same assigns the frequency segments to the terminal apparatus (S10 of FIG. 5), and the sequence in the message of FIG. 9 are aligned, the mapping at the base station apparatus side is possible. Even if this premise is broken, if the frequency segment ID is added to each indicator, the mapping at the base station apparatus is possible; however, the feedback information amount increases, therefore it is desirable to the premise above.

Here, the description is back to FIG. 5.

When the base station apparatus receives the feedback of the control information (S6) from the terminal apparatus, the base station apparatus first carries out a choice of the terminal apparatuses to which downlink packets are sent based on the Proportion Fairness, among the terminal apparatus to which the frequency segments have been already assigned. The base station apparatus carries out the adaptation modulation based on the indicator of the real-time communication quality fed back from the terminal apparatus, and generates downlink packets corresponding to respective addresses per each frequency segment (S7).

Next, an expected value of the number of communication times in respective all the frequency segments per each terminal apparatus is calculated (S8). Herein, the arrival direction estimation result (in the case to carry out the spatial multiplex communication per each frequency segment) by the pilot signal included in the uplink signal, and the frequency segment assignment information at the present are referred to. Hereinafter, a calculation method of the expected value will be described.

When one terminal apparatus is assigned newly to the frequency segment 1 of FIG. 1, since the frequency segments that have been shared by five units are shared by six units, the expected value of the number of communication times becomes ⅙. In the same manner, an expected value about the frequency segment 2 becomes ⅓.

When one terminal apparatus is assigned newly to the frequency segment 1 of FIG. 2, if the angle difference with the already assigned terminal apparatus is the Threshold or below (for example, 15 degrees), the frequency segments and the directional beams are shared by three terminal apparatuses, thereby, the expected value of the number of communication times becomes ⅓; however, when the angle difference is much more than the threshold value, since the terminal apparatus to be assigned newly can perform the spatial multiplex communication with two terminal apparatuses, the expected value becomes 1. The above description is shown in FIG. 10.

The upper section of FIG. 10 shows the case in which a frequency segment is assigned to a terminal apparatus 13-1-*c* that is in the same direction as that of two terminal apparatuses 13-1-*a, b*. In this case, because of the difficulty of the space division multiplex communication, the expected value of the number of communication times about each terminal apparatus becomes ⅓. The lower section of FIG. 10 shows the case where a frequency segment is assigned to a terminal apparatus 13-1-*c* that is in a direction different from that of the two terminal apparatuses 13-1-*a, b*. In this case, since the space division multiplex communication is possible with the existing terminal apparatuses, the expected value becomes 1 about the new terminal apparatus.

When the calculation method of the expected value is generalized, it can be expressed by the inverse number of the number of the terminal existing within X degree from the terminal apparatus. About the X degree, 360 degrees are equivalent to the X degree about the Omni beam, and the smallest interval between the main beam direction and the null direction at which the array antenna of the base station apparatus can be generated is equivalent to X degree about the directional beam.

With the explanations in the foregoing, the calculation method of the expected value ends.

When the expected value calculation of the number of communication times of each terminal apparatus is completed, together with the statistic values of the communication capacity of each frequency segment of each terminal apparatus obtained from the feedback control information (S5) about all the frequency segments from the terminal apparatus, the frequency segments to be assigned to each terminal apparatus is decided (S9).

First, as shown in FIG. 11, from the average and the standard deviation of the communication capacity that the terminal apparatus feeds back, the communication capacity to become the control target is defined as a Threshold, and the occurrence probability of the communication capacity exceeding the Threshold (high communication capacity) is calculated per each frequency segment. The concrete calculation procedure is shown below.

When a probability density function of the communication capacity "c" about the frequency segment "s" of the terminal apparatus "u" is defined as fu,s(c), the probability Fu,s(cT) exceeding the Threshold (CT) is defined according to the following expression.

$$F_{u,s}(CT) = \int_c^\infty f_{u,s}(c)\,dc \qquad \text{Expression 1}$$

It is supposed that this probability density function fu,s(c) follows the normal distribution of the average μu,s and the standard deviation σu,s.

$$z = \frac{c - \mu_{u,s}}{\sigma_{u,s}} \qquad \text{Expression 2}$$

When the above variable conversion is carried out, under the above assumption, the probability Fu,s(cT) is expressed according to the following expression.

$$F_{u,s}(CT) = \int_{(CT-\mu_{u,s})/\sigma_{u,s}}^\infty f_{u,s}(z)\,dz \qquad \text{Expression 3}$$

Therein, f(z) is a probability density function according to the standard normal distribution. The initial point of the integral calculus of this expression shows that how many times the standard deviation σu,s should be multiplied to correspond to CT to the average μu,s of each frequency segment. The above integral calculus is made at each time or carried out by a table look-up of the calculation value with respect to the initial point of the integral calculus.

When the table of FIG. 11 is filled, it is possible to calculate the evaluation function for the assignment per each frequency segment as shown in FIG. 12. The inputs are: the expected value of the number of communication times; and the high communication capacity incidence calculated in relation with FIG. 11. In the example of FIG. 12, a product of the expected value of the number of communication times and the high communication capacity incidence is calculated, and the evaluation function value (assignment evaluation value) is calculated. The evaluation function is not limited to the form of the product of the both variables. The base station apparatus assigns higher M pieces of the segments among the frequency segments whose assignment evaluation values are large to the terminal apparatus.

The M segments assigned to each terminal apparatus is the segments in which the high communication quality is easy to be secured by scheduling, and many numbers of communication times are prospective, in all the N segments, and the M segments are a combination of the M segments to increase the downlink throughput per each terminal apparatus. The reason why the indicator feedback is limited to the M segments to each terminal apparatus is to reduce the enormous uplink throughput of the base station that is necessary for the indicator feedback, and to improve the uplink throughput of useful user data.

When the procedure to the frequency segment assignment is completed, the base station apparatus transmits the data packets and the pilot signals to be sent per each frequency segment decided by the scheduling of S7 and the assignment result of the frequency segments determined in S9 as the control signal to the terminal apparatus.

FIG. 13 shows an example of a message format to notify the assignment result of the frequency segments to the terminal apparatus. The first Message ID is the 8-bit value promised with the terminal apparatus, and the purpose is to show that the following information is an ID of the frequency segments assigned to the terminal apparatus. The second stage shows the terminal apparatus ID of the notification destination. AssignSegmentID #n (n being 0 to N−1, N being the number of all the segments) after the third stage is a flag that shows 1 in the case of the frequency segment assigned to the terminal apparatus, and 0 otherwise, and the terminal apparatus follows this notification, and feeds back the instantaneous value of the downlink communication quality.

The control explained above can be divided into two controls of the short cycle and the long cycle.

Figure 6:
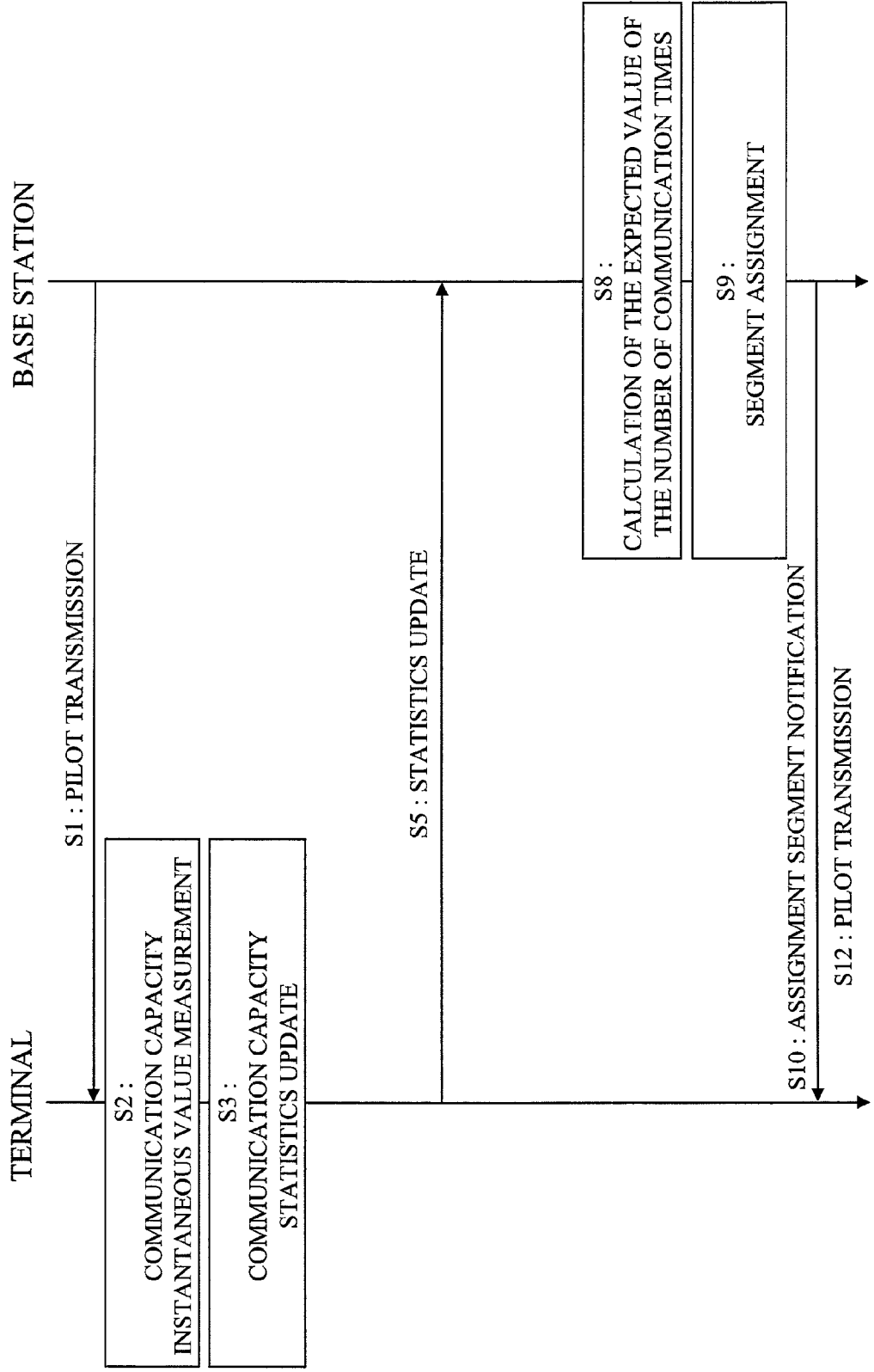
FIG. 6 is a diagram showing an extract of a long-period control part of the control method according to the present invention.

The long cycle control to be accompanied with the statistics values feedback of FIG. 8 is the control to limit the number of the segments for feeding back the indicator of the communication capacity instantaneous value per each terminal apparatus. FIG. 6 shows the control sequence in which the part of the long cycle control is extracted from FIG. 5. The long cycle control includes the pilot transmission from the base station apparatus (S1), the communication capacity instantaneous value measurement by the terminal apparatus (S2), the statistics values update of the communication capacity (S3) and the statistics values feedback to the base station apparatus (S5), the expected value of the number of communication times calculation per each segment per each terminal apparatus (S8), the segment assignment from the fed back statistics values and the calculated expected value to the terminal apparatus (S9) and the notification of the assignment result (S10). The last pilot transmission (S12) has a function as a pilot for detection of the slot and a function as the S1 in the next slot.

In addition, so as to start communications immediately, the terminal apparatus to which any frequency segment is not assigned can take the instantaneous value of the communication capacity as the statistics and the feedback is carried out by the message of FIG. 8, so that the frequency segment assignment by the base station apparatus is carried out. At this moment, the average value of the communication capacity becomes the instantaneous value, and the standard deviation value becomes 0.

The short cycle control to be accompanied with the indicator feedback of FIG. 9 is the control to decide the transmission destination terminal apparatus of the data packet per each downlink frequency segment, by scheduling per each slot. With regard to the indicator, the feedback is carried out per each slot (or at a time interval at which the transmission path change in the time direction is considered to be small enough). However, the terminal apparatus to which any frequency segment assignment is not carried out by the long cycle control (to which the assignment result is not notified) does not carry out the feedback.

Figure 7:
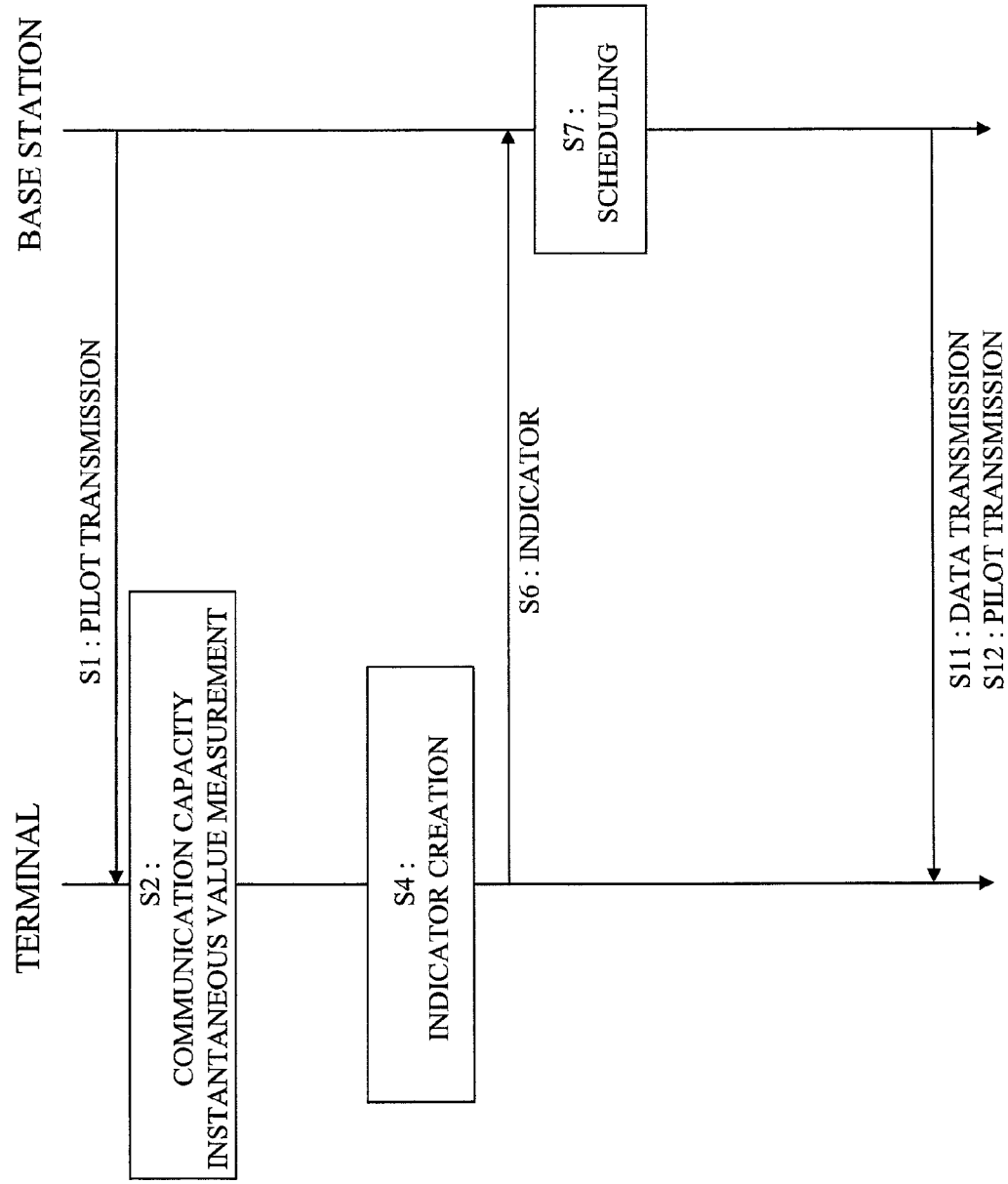
FIG. 7 is a diagram showing an extract of a short-period control part of the control method according to the present invention.

The control at this short cycle is carried out according to the control sequence shown in FIG. 7. FIG. 7 is a part of FIG. 5. The short cycle control includes the pilot transmission from the base station apparatus (S1), the communication capacity instantaneous value measurement by the terminal apparatus (S2), the indicator creation of the instantaneous value (S4) and the feedback to the base station apparatus (S6), the scheduling based on the indicator (S7), and the data transmission according to the scheduling result (S11). The last pilot transmission (S12) has a function as a pilot for detection of the slot and a function as the S1 in the next slot.

Figure 14:
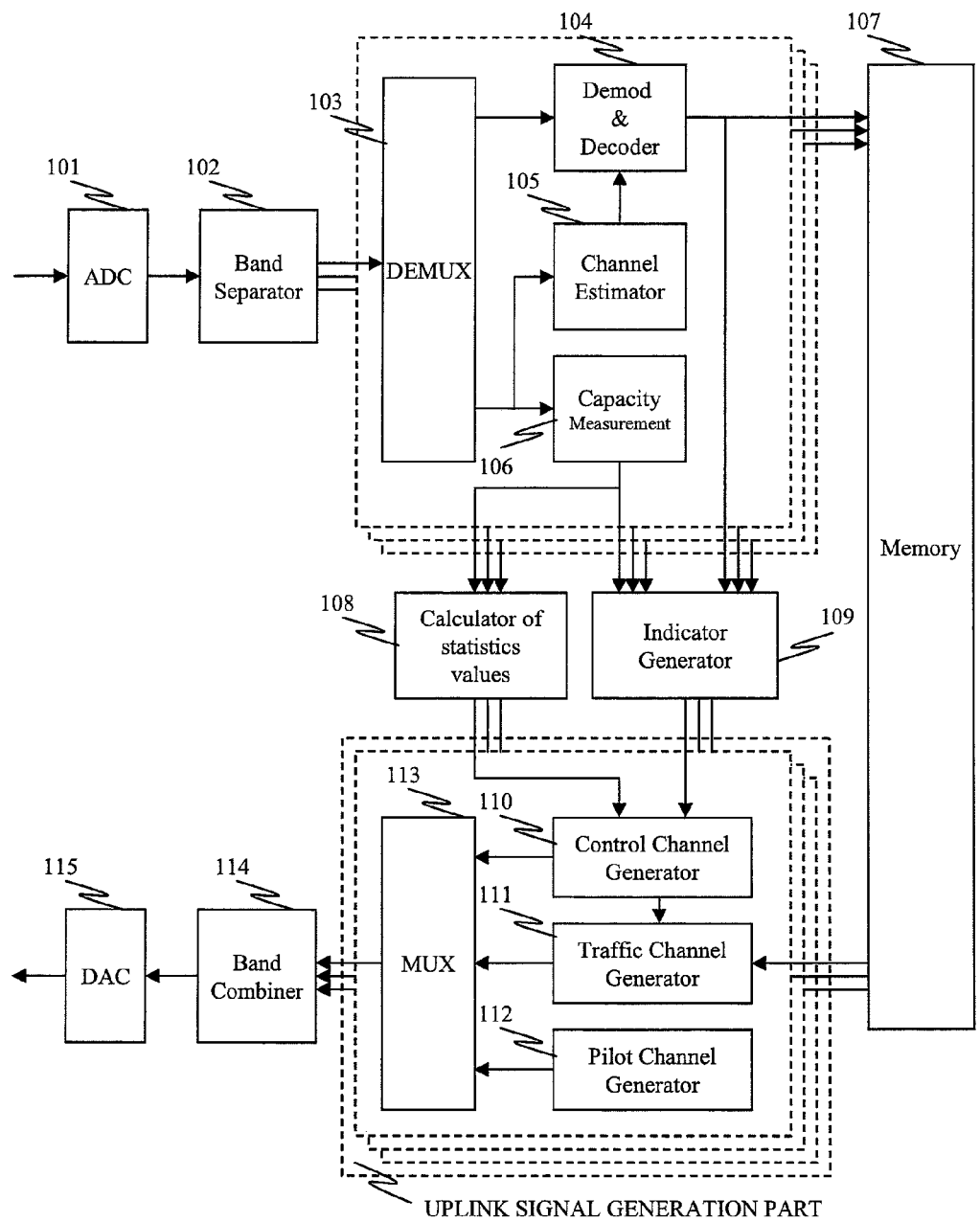
FIG. 14 is a diagram showing a best embodiment of a terminal apparatus according to the present invention.

FIG. 14 is one example of the embodiment of the terminal apparatus according to the present invention.

The received signal from the base station apparatus is converted digitally by an analog-digital converter (ADC 101) after it goes through the analog signal process, a broadband signal is divided per each frequency segment by a downlink segment division part (Band Separator 102), and the processes of the latter stage is carried out per each frequency segment. In the case of a downlink signal of OFDMA, the downlink segment division part is realized by an FFT (Fast Fourier Transform).

The received signal per each segment is separated into a pilot signal and other signal than the pilot by a downlink pilot separation part (DEMUX 103). The pilot signal is used for the calculation of the instantaneous communication capacity of the frequency segment by an instantaneous capacity calculation part (Capacity Measurement 106), and the channel estimation by a downlink channel estimation part (Channel Estimator 105). When a channel estimation result is inputted into a downlink demodulation decoding part (Demod & Decoder 104), the same part carries out the detection of the signal, and through a demodulation decoding process, the user data signal and the control signal are recovered. The user data signal is stored into a memory (Memory 107), and the control signal transmitted from the base station apparatus is inputted into an indicator generation part (Indicator Generator 109) of the instantaneous communication capacity. The control signal inputted into the indicator generation part is a control signal transmitted in the format of FIG. 13 from the base station apparatus, and it is a flag to show whether each segment is assigned to the terminal apparatus (it shows the segment to which the indicator should be fed back).

Figure 15:
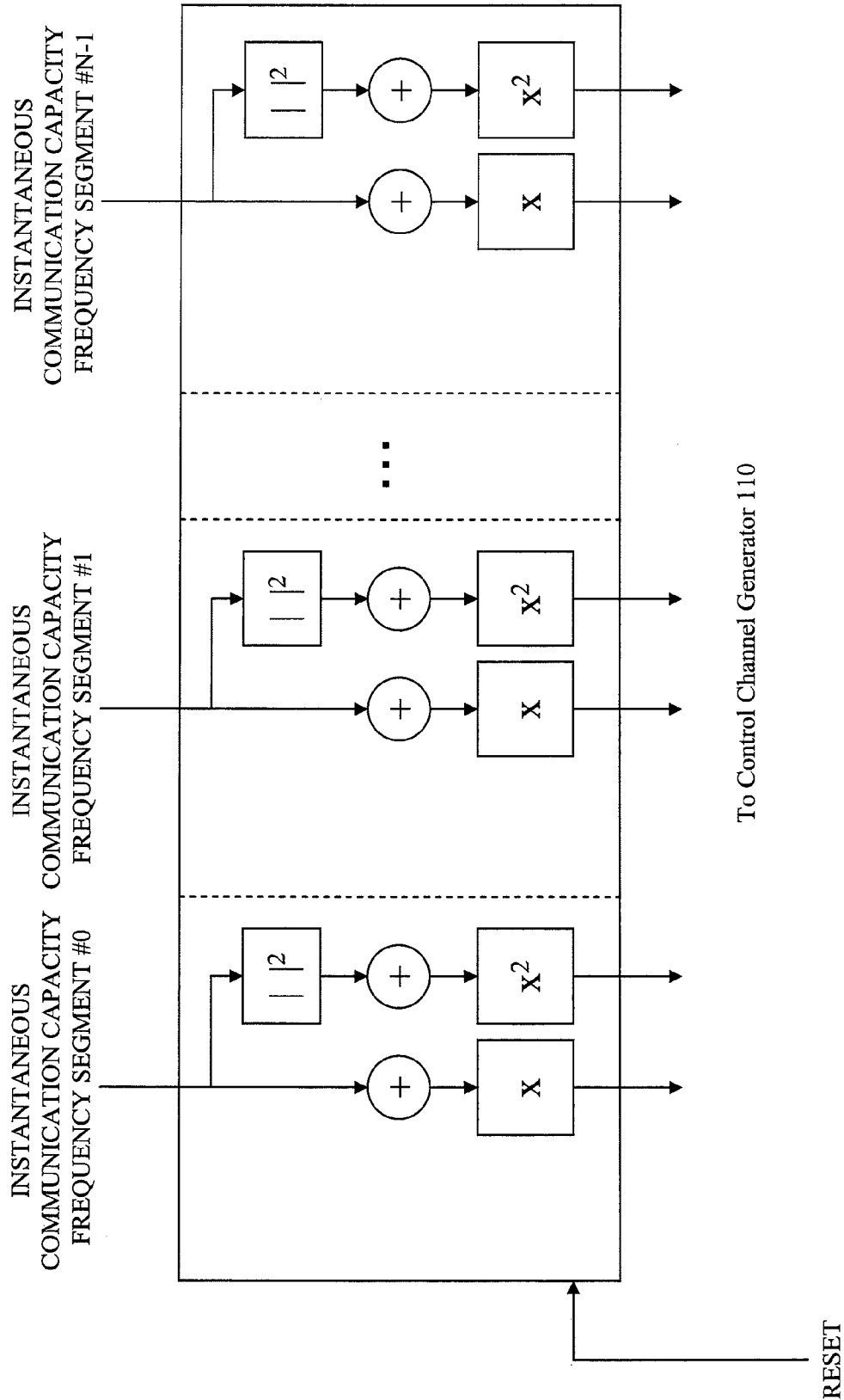
FIG. 15 is a diagram showing a structure of a statistics value calculation part of the communication capacity.

A statistics value calculation part (Calculator of statistics values 108) of the communication capacity has a structure as shown in FIG. 15. The instantaneous value of the communication capacity is inputted from the instantaneous capacity calculation part (Capacity Measurement 106) of each frequency segment, and the accumulation of the instantaneous value and the accumulation of the square value of the instantaneous value are carried out. When an uplink control signal generation part (Control Channel Generator 110) reads the accumulation values, and calculates the average value and the standard deviation value of the communication capacity per each frequency segment, a trigger to reset the accumulation result is operated.

Figure 16:
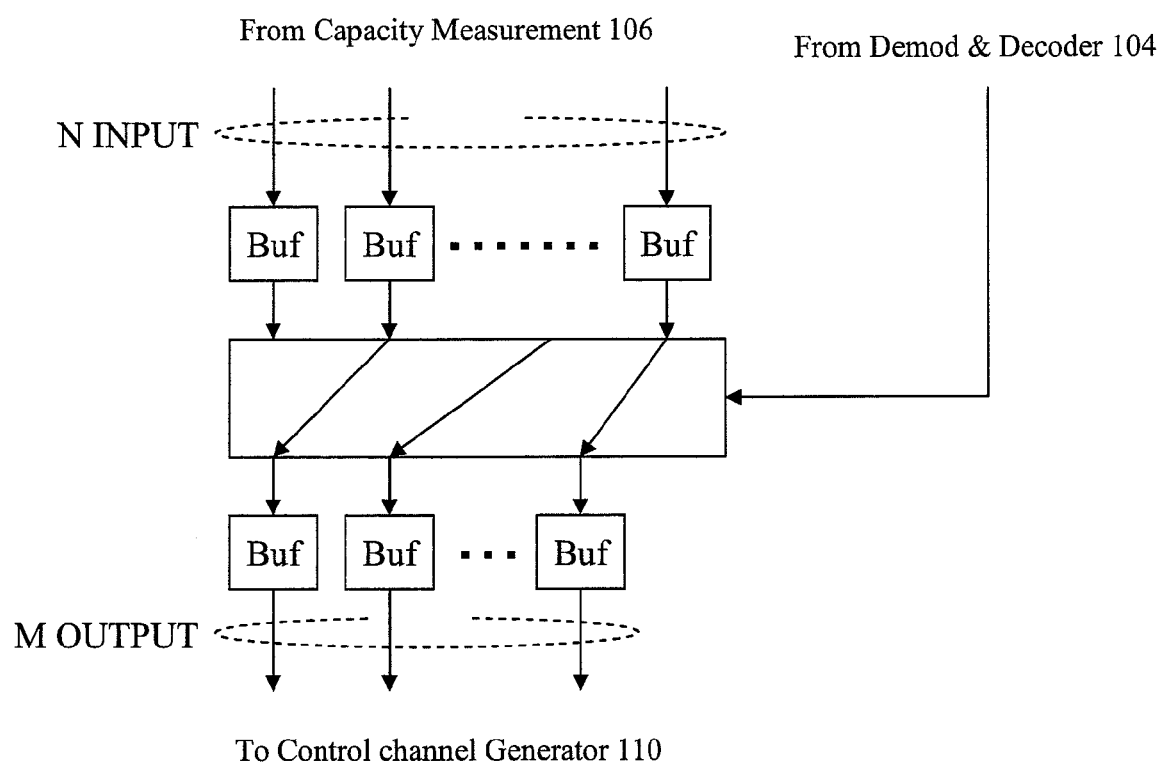
FIG. 16 is a configuration diagram showing a structure of an indicator generation part about the communication capacity instantaneous value.

The indicator generation part (Indicator Generator 109) has a structure as shown in FIG. 16. First, the indicator generation part stores the instantaneous value of the communication capacity from the instantaneous capacity calculation part (Capacity Measurement 106) of each frequency segment temporarily into a buffer. The indicator generation part refers to the assignment frequency segment information (FIG. 13) inputted from the downlink demodulation decoding part (Demod & Decoder 104), and skips the frequency segment that is not assigned to the terminal apparatus, and stores the value of the input buffer in the output buffer in the ascending order of the segment numbers sequentially. The uplink control signal generation part (Control Channel Generator 110) refers to the value of the output buffer.

The uplink control signal generation part carries out the reference of the calculation result of the statistics value calculation part and the issue of the reset trigger at a long cycle, and carries out the reference of the output buffer of the indicator generation part at a short cycle.

Herein, the explanation of FIG. 14 is made again.

The uplink control signal generation part (Control Channel Generator 110) follows the formats shown in FIGS. 8 and 9 and creates a control signal, from the information that the statistics value calculation part (Calculator of statistics values 108) and the indicator generation part (Indicator Generator 109) generate, and carries out encoding and modulation. The information of the indicator generation part is transmitted to the base station at one slot or a cycle following the same. The information of the statistics value calculation part is read at a specified cycle, and reset to the statistics value calculation part, and then, averaging to the read value and the standard deviation calculation are carried out, and the control signal is sent to the base station. Note that, since the above control signal is not a control signal peculiar to the frequency segment, it is treated as high priority information, as a payload of the data signal of a certain segment. Since it is unclear whether the control information is sent at which uplink frequency segment, from perspective of the base station apparatus, it is necessary to set the protocol with the base station apparatus (for example, by promising by the message ID).

The uplink data signal generation part (Traffic Channel Generator 111) reads out the user data from the memory (Memory 107), and carries out encoding and modulation. The uplink pilot signal generation part (Pilot Channel Generator 112) generates a known reference signal in the base station apparatus.

The control signal, the data signal, and the pilot signal are multiplexed by a time-multiplexing method and the like in an uplink multiplex signal generation part (MUX 113). The uplink segment combination part (Band Combiner 114) combines the signal after the multiplexing about all the uplink segments. In the case of an uplink signal of OFDMA, the uplink segment combination part is realized by IFFT (Inverse Fast Fourier Transform). Note that, when the number of the uplink segments is 1, the uplink segment combination part becomes unnecessary. Thereafter, the signals pass a digital analog converter (DAC 115), and go through the analog signal process, and then transmitted to the base station apparatus by a transmitting antenna.

Other parts than the analog digital converter, the digital analog converter, and the memory among the terminal apparatuses can be realized by DSP, FPGA or ASIC.

Figure 17:
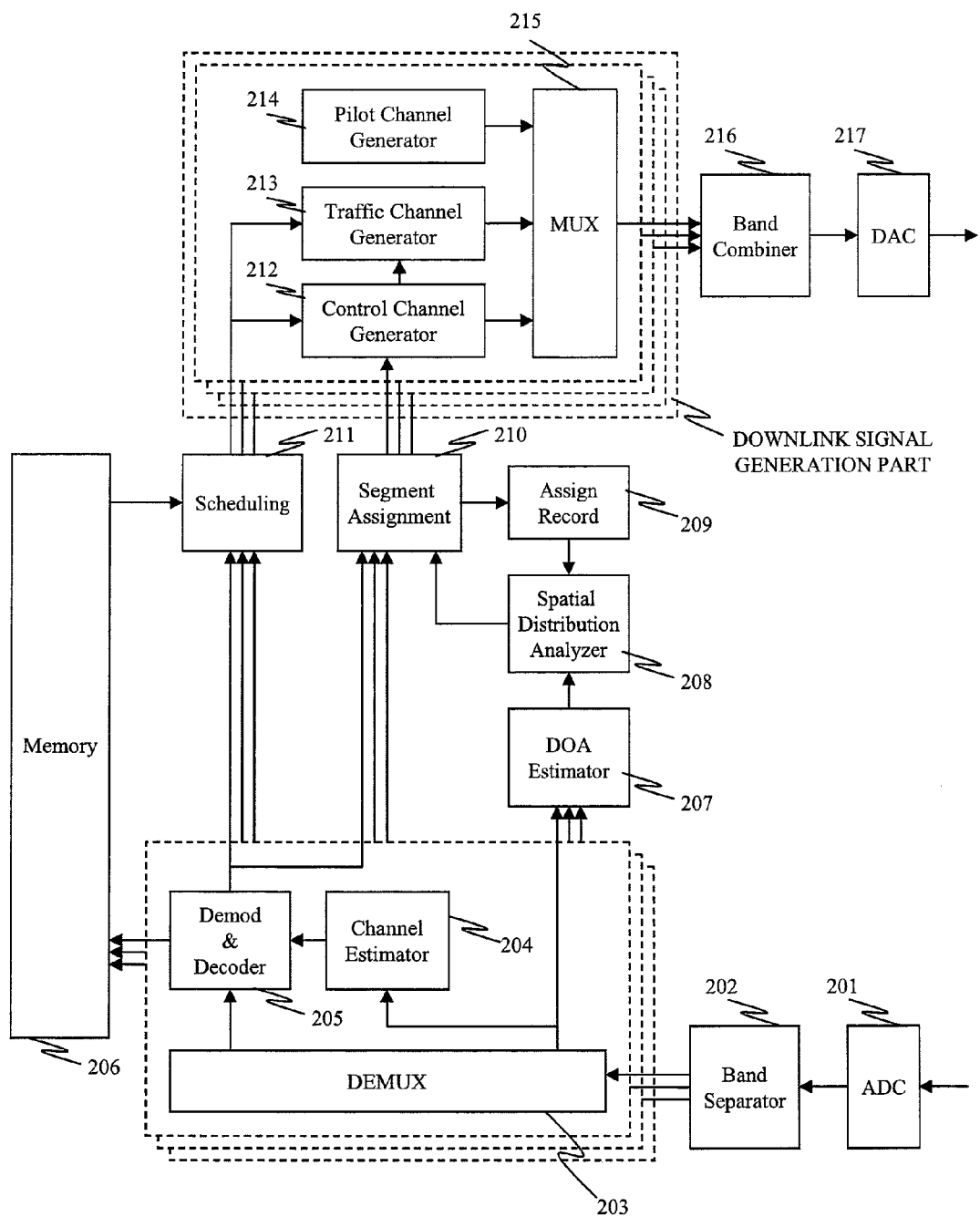
FIG. 17 is a diagram showing a best embodiment of a base station apparatus according to the present invention.

FIG. 17 is one example of an embodiment of the base station apparatus according to the present invention.

The received signal from the terminal apparatus is converted digitally by an analog-digital converter (ADC 201) after it goes through the analog signal process, a broadband signal is divided per each frequency segment by an uplink segment division part (Band Separator 202), and the processes of the latter stage is carried out per each frequency segment. In the case of an uplink signal of OFDMA, the uplink segment division part is realized by an FFT (Fast Fourier Transform). In addition, when the number of the uplink segments is 1, the uplink segment division part becomes unnecessary.

The received signal per each segment is separated into a pilot signal and other signal than the pilot by an uplink pilot separation part (DEMUX 203). The pilot signal is used for the channel estimation by an uplink channel estimation part (Channel Estimator 204), and the direction estimation per each terminal apparatus by an arrival direction estimation part (DOA Estimator 207). When a channel estimation result is inputted into an uplink demodulation decoding part (Demod & Decoder 205), the same part carries out the detection of the received signal, and through a demodulation decoding process, the user data signal and the control signal are recovered. The user data signal is stored into a memory (Memory 206), and with regard to the control signal, the indicator of the instantaneous communication capacity is inputted into a scheduler (Scheduler 211), and the statistics values of the communication capacity is inputted into a segment assignment part (Segment Assignment 210) respectively. The above operations, except for the input to the segment assignment part of the communication capacity statistic, are carried out at a short cycle in unit of slot.

The scheduler (Scheduler 211) chooses a terminal apparatus to become the communication partner per each frequency segment per each slot by algorithm based on the Proportional Fairness. Before that, it is necessary to convert the scheduler, based on the indicator of the instantaneous communication capacity fed back by the terminal apparatus, into the transmission rate at which it is anticipated each terminal apparatus can communicate in each frequency segment. By a table in the same manner as that in the prior art (refer to FIG. 18), the indicator is converted into the anticipated transmission rate, except that the anticipated transmission rate of the frequency segment without the feedback of the indicator is made 0.

An example of a concrete scheduling method is shown below.

When the downlink average transmission rate of a terminal apparatus u is defined as aveR(u), and the anticipated transmission rate in a frequency segment s is defined as instR(u, s), the evaluation function P(u, s) of the Proportional Fairness is expressed as follows.

$$P(u, s) = \frac{{}_{inst}R(u, s)}{{}_{ave}R(u)} \qquad \text{Expression 4}$$

The u,s at which this value becomes maximum are chosen, and the frequency segment s is assigned to the terminal apparatus u, and the average transmission rate aver (u) of the terminal apparatus u is updated on assumption that the downlink transmission succeeds, and then the communication partners about the remaining frequency segments are decided in the same manner.

By the above process, the terminal apparatus of the communication partner and the transmission rate are decided per each frequency segment. At the same time, the number of the bits, the encoding rate, and the modulation method per each frequency segment are decided according to FIG. 18. The user data to the terminal apparatus chosen per each frequency segment is read out from the memory (Memory 206) for only the number of the bits equivalent to the transmission rate, and sent to a downlink data signal generation part (Traffic Channel Generator 213) of the corresponding frequency segment. At the same time, the information of the encoding rate and the modulation method is also sent.

Further, the ID of the terminal apparatus that the scheduler chooses per each frequency segment is notified to a downlink control signal generation part (Control Channel Generator 212). By burying the terminal apparatus ID in the downlink control signal, the terminal apparatus monitors the control signal, and it is possible to judge whether the data to its own terminal apparatus are stored in the frequency segment. Thereby, since each terminal apparatus does not have to carry out the demodulation decoding process of the frequency segments to which its own data are not transmitted, effects such as the reduction of the electricity consumption and the hardware scale of the terminal apparatus are expected.

The arrival direction estimation part (DOA Estimator 207) receives the uplink pilot signal from the terminal apparatus by an array antenna, and carries out arrival direction estimation based on MUSIC (MUltiple SIgnal Classification) method. The pilot of any uplink frequency segment may be used, but the estimation precision becomes higher by choosing the frequency segment whose receiving SINR is higher. The direction estimation result per each terminal apparatus is notified to the spatial distribution analysis part (Spatial Distribution Analyzer 208). It is desirable that the operation of the arrival direction estimation part is in a short cycle. When a frequency segment assignment is carried out to a certain terminal apparatus, if the direction of other terminal apparatuses is maintained at its latest state by short cycle update, it is possible to carry out the calculation of the expected value of the number of communication times more precisely, and precisely specify the frequency segment that can secure more numbers of communication times, which leads to the improvement of the downlink throughput of the terminal apparatus.

An assignment information record part (Assign Record 209) is a memory to record which terminal apparatus is assigned to each frequency segment. It is recorded by a segment assignment part (Segment Assignment 210), and it is referred to by the spatial distribution analysis part.

FIG. 19 is one example of the information that the spatial distribution analysis part manages. It merges the direction estimation result per each terminal apparatus and the assignment result of the frequency segment. It records the number of terminal apparatuses assigned to each frequency segment, and the direction per each terminal apparatus. Separately from this, it also has the information of the arrival direction about the terminal apparatus of unassigned segment.

The spatial distribution analysis part (Spatial Distribution Analyzer 208) calculates the expected value of the number of communication times when it is supposed that the assignment of the frequency segment is carried out to assume it a judgment material when frequency segments are assigned to all the terminal apparatuses. This calculation is carried out at every time when a segment to feed back the indicator to the terminal apparatus is decided, in other words, at a long cycle.

FIG. 20 shows a case to assign a terminal apparatus (ID0) again from the state of FIG. 19. The shaded hatch is the part changed from FIG. 19. When attention is paid to each frequency segment, the segment 0, to which the terminal apparatus is already assigned, does not change, and as for the segments 1 and 2, the number of the terminal apparatuses increases by 1. In all the frequency segments, when downlink packets are transmitted by the Omni beam pattern, because all the other terminal apparatuses which are already assigned to each segment become competitors, the expected value of the number of communication times about the terminal apparatus (ID0) is ½ with segment 0, ⅓ with segment 1, and ¼ with segment 2. From the above, the expected value of the number of communication times about the terminal apparatus (ID0) is summarized as shown in FIG. 21A.

With FIG. 20 as assumption, now suppose the case in which the base station apparatus carries out the spatial multiplex transmission by the directional beam. When the terminal apparatus whose angle difference is 30 degrees or more with the terminal apparatus (ID0) is considered not to be a competitor, the expected value of the number of communication times of segment 1 is ½ because the terminal apparatus (ID2) becomes its competitor, and the expected value of segment 2 is 1 because all the terminal apparatuses do not become competitors. Segment 0 is also similar to segment 2. At this moment, the expected value of the number of communication times about the terminal apparatus (ID0) is summarized as shown in FIG. 21B.

The FIGS. 21A and 21B that are summarized as above are referred to by the segment assignment part (Segment Assignment 210).

The segment assignment part (Segment Assignment 210) inputs the statistic of the communication capacity from the uplink demodulation decoding part (Demod & Decoder 205), and the expected value of the number of communication times from the spatial distribution analysis part (Spatial Distribution Analyzer 208), and carries out the calculation shown in FIG. 12, and assigns M pieces of the frequency segments per each terminal apparatus. The timing of the assignment is carried out by the timing at which the statistics values of the communication capacity are inputted, and the old assignment is cancelled once on this occasion. The assignment result is transmitted to a downlink control signal generation part (Control Channel Generator 212), and notified to the terminal apparatus as the message shown in FIG. 13.

The downlink control signal generation part (Control Channel Generator 212) generates information including the terminal apparatus ID scheduled as the control signal peculiar to the frequency segment, from the information that the scheduler and the segment assignment part generate, and creates the control signal of the segment assignment result according to the format shown in FIG. 13 as a control signal peculiar to the terminal apparatus, and carries out encoding and modulation.

Because the control information (segment assignment information) peculiar to the terminal apparatus is not a control signal peculiar to the segment, it is treated as high priority information, as a payload of the data signal of a certain segment. In order to handle such information, the case when the frequency segment assignment is not done in the initial state is supposed too, and one frequency segment which is common to all the terminal apparatuses is prepared, and made the segment that is always assigned to all the terminal apparatuses. If there is not the high priority control information, the user data signal may be transmitted.

The downlink data signal generation part (Traffic Channel Generator 213) carries out encoding and modulation on the bit groups sent from the scheduler, according to the encoding rate and the modulation method sent at the same time. The downlink pilot signal generation part (Pilot Channel Generator 214) generates a known reference signal by the terminal apparatus.

The control signal, the data signal, and the pilot signal are multiplexed by a time-multiplexing method and the like in a downlink multiplex signal generation part (MUX 215). The downlink segment combination part (Band Combiner 216) combines the signal after the multiplexing, about all the downlink segments.

In the case of a down signal of OFDMA, the downlink segment combination part is realized by IFFT (Inverse Fast Fourier Transform). Thereafter, the signals pass a digital analog converter (DAC 217), and go through the analog signal process, and then transmitted to the terminal apparatus from a transmitting antenna.

Further, in the case when the spatial multiplex communication is carried out in the frequency segment, an array signal process is carried out to the output of a downlink multiplex signal generation part (MUX215). A downlink segment combination part (Band Combiner 216), a digital analog converter (DAC 217) and the analog signal process at the latter stages are realized per each transmitting antenna element.

Other parts than the analog-digital converter, a digital analog converter, and the memory, among the base station apparatuses may be realized by DSP, FPGA, and ASIC.

INDUSTRIAL APPLICABILITY

The present invention is realized in the base station apparatus and the terminal apparatus in the wireless communication system. In particular, it is effective in the broadband wireless communication system.

The invention claimed is:

1. A method of assigning frequency resource for a wireless communication system in which a base station apparatus and a plurality of terminal apparatuses perform communications, the method comprising:
dividing a frequency available in the wireless communication system into a plurality of segments and assigning another terminal apparatus to communicate with to each segment, wherein,
with regard to a first specified number of segments, assigning via the base station apparatus, based on a number of communication times anticipated per each terminal apparatus and a probability of exceeding a communication capacity decided by a threshold value per each terminal apparatus, a second specified number of segments that is smaller than the first specified number to each terminal apparatus, and notifying the terminal apparatuses of the assignment result, referring to the assignment result via the terminal apparatus, and feeding back a radio channel quality of assigned segments to the base station apparatus, and carrying out scheduling via the base station apparatus to decide which terminal apparatus to communicate with per each segment based on the radio channel quality fed back from the each terminal apparatus.

2. The method of assigning frequency resource according to claim 1, wherein the base station apparatus records direction information of each of the terminal apparatuses which have been already assigned to each segment (where terminal apparatuses A1, . . ., AK, K are the number of the terminal apparatuses which have been already assigned to each segment), and makes a number of communication times of a terminal apparatus (terminal apparatus B) to be newly assigned to the segment to an inverse number of a value obtained by adding 1 to the number of the already assigned terminal apparatuses positioned within an angular difference of X degree (X =0 to 360) about the terminal apparatus B.

3. The method for assigning frequency resource according to claim 1, wherein the terminal apparatus measures a communication capacity per each segment by a reference signal that the base station apparatus transmits, and calculates statistics values of the communication capacity, and feeds back the statistics values to the base station apparatus, and the base station apparatus calculates a probability (high communication capacity probability) of exceeding the communication capacity threshold value common to all the segments from the statistics values of the communication capacity per each segment fed back from the terminal apparatus.

4. The method of assigning frequency resource according to claim 3, wherein the terminal apparatus samples an instantaneous value of the communication capacity per each segment at a specified time interval, accumulates the instantaneous value and the square value thereof, calculates an average value and an standard deviation value of the communication capacity per each segment from the instantaneous value and the square value at a specified cycle, and feeds back the average value and the standard deviation value to the base station apparatus.

5. The method of assigning frequency resource according to claim 1, wherein the base station apparatus adds an identification number that is unique to the terminal apparatus to the assignment result as information unique to the terminal apparatus, and transmits the assignment result to the terminal apparatus by using the segments assigned to the terminal apparatus.

6. The method of assigning frequency resource according to claim 1, wherein the base station apparatus has a segment to be assigned to the terminal apparatuses, so as to notify the terminal apparatus to which any segment is not assigned of the assignment result.

7. The method of assigning frequency resource according to claim 1, wherein the terminal apparatus adds an identification number that is unique to the terminal apparatus to the communication capacity indicator of a segment appointed by the assignment result as information unique to the terminal apparatus, and transmits the communication capacity indicator to the base station apparatus.

8. The method of assigning frequency resource according to claim 1, wherein the notification of the assignment result of the second specified number of segments is performed at a frequency that is lower than that of the feedback of the radio channel quality per the each segment.

9. A terminal apparatus used in a wireless communication system in which a base station apparatus and a plurality of terminal apparatuses perform communications, and the wireless communication system carries out scheduling to divide a frequency available in the wireless communication system into a plurality of segments and to assign another terminal apparatus to communicate with to each segment, terminal apparatus comprising:

a segment division part that divides a received base band signal per each segment;

a pilot separation part that separates a reference signal and other received signals per each segment;

a channel estimation part that performs a channel estimation per each segment by use of the reference signal;

a communication capacity measurement part that estimates a communication quality per each segment by use of the reference signal, and converts the communication quality per each segment into a communication capacity;

a demodulation decoding part that detects other signals than the reference signal by the channel estimation result, and performs demodulation and decoding so as to recover a data signal and a control signal;

a statistics value calculation part that calculates the statistics values of the communication capacity per each segment from the measurement result of the communication capacity;

an indicator generation part that converts the instantaneous value into an indicator whose information amount is small so as to feed back the measurement result of the communication capacity as an instantaneous value of the communication capacity to the base station apparatus; and an uplink signal generation part that performs an encoding, modulation process of a reference signal, a data signal, and a control signal to be sent to the base station apparatus, and multiplexes and outputs the respective signals.

10. The terminal apparatus according to claim 9, wherein the notification of the assignment result of a second specified number of the segments is performed at a frequency that is lower than that of the feedback of the radio channel quality per each segment.

11. A base station apparatus used in a wireless communication system in which a base station apparatus and a plurality of terminal apparatuses perform communications, and the wireless communication carries out scheduling to divide a frequency available in the wireless communication system into a plurality of segments including a first specified number of segments, and assigns another terminal apparatus to communicate with to each segment, the base station apparatus comprising:

a demodulation decoding part that performs demodulation and decoding on a received base band signal, and recovers a control signal received from the each terminal;

a scheduling part that performs scheduling to decide which terminal apparatus to communicate data by each segment by use of first radio channel quality information of each of a second specified number of segments assigned to the each terminal apparatus included in the recovered control signal;

an assignment recording part that records an assignment result of the terminal apparatus to each segment;

a segment assignment part that calculates a high communication capacity probability per each segment by use of second radio channel quality information per each segment per each terminal apparatus included in the recovered control signal, calculates an evaluation function value per each terminal apparatus per each segment according to an evaluation function including an expected value of a number of communication times per each segment with regard to the terminal apparatus that newly carries out a segment assignment based on the assignment result, and assigns the second specified number of segments among the first specified number of segments based on the evaluation function value;

a downlink signal generation part that performs an encoding and modulation process of a reference signal, a data signal, and a control signal to be sent to a terminal apparatus, and multiplexes and outputs the respective signals; and a frequency multiplexing part that performs a frequency multiplex of a downlink signal generated per each segment.

12. The base station apparatus according to claim 11, wherein a direction estimation part that receives a received reference signal by an array antenna and estimates a direction per terminal apparatus is provided, and a calculation part of an expected number of communication times refers to the direction estimation result, and an output of the downlink signal generation part is distributed to a plurality of transmission antennas, and amplitude and phase are controlled per each segment and per each transmission antenna, and the frequency multiplexing part is provided per each transmission antenna.

13. The base station apparatus according to claim 11, wherein the assignment of the segment is carried out at a frequency that is lower than that of the scheduling in the assignment of the second specified number of segments.

* * * * *